July 1, 1952   W. H. SCHOPPER   2,601,888
AUTOMOBILE BUMPER SEAT
Filed Oct. 12, 1950                                  2 SHEETS—SHEET 1
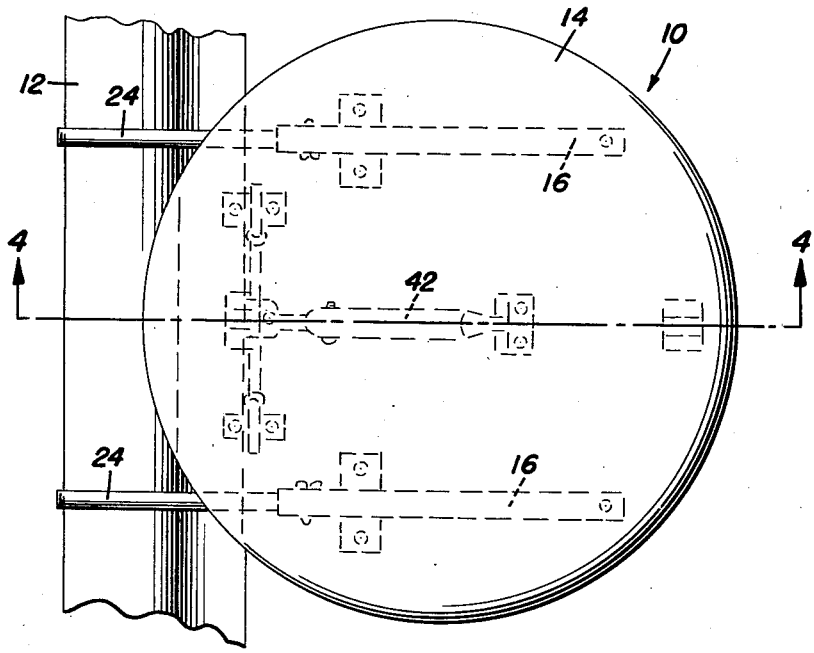
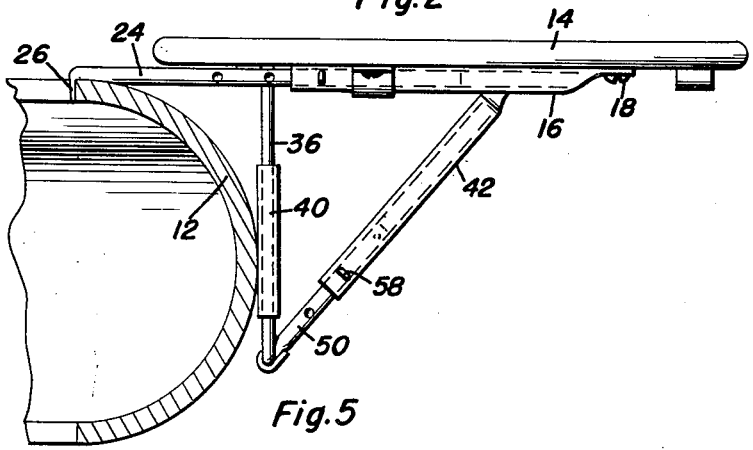
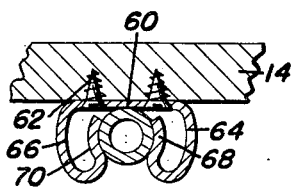
William H. Schopper
*INVENTOR.*

July 1, 1952  W. H. SCHOPPER  2,601,888
AUTOMOBILE BUMPER SEAT

Filed Oct. 12, 1950  2 SHEETS—SHEET 2

William H. Schopper
INVENTOR.

BY *Clarence A. O'Brien
and Harvey B. Jackson*
Attorneys

Patented July 1, 1952

2,601,888

UNITED STATES PATENT OFFICE 2,601,888

AUTOMOBILE BUMPER SEAT

William H. Schopper, Indianapolis, Ind.

Application October 12, 1950, Serial No. 189,793

5 Claims. (Cl. 155—79)

This invention comprises novel and useful improvements in a bumper seat and more specifically pertains to a collapsible chair construction specifically adapted for convenient and efficient attachment to the bumper of an automobile to provide an auxiliary seat for the same and which may be selectively folded or collapsed into a compact assembly in which the support means, the legs and braces of the device are compactly retained against the under side of the seat and within the perimeter of the same.

The primary object of this invention is to provide an auxiliary collapsible seat specifically adapted for use as an accessory for automotive vehicles and for detachable mounting upon the bumper of the same and especially for use at open air theatres, picnics, and similar uses.

A further object of the invention is to provide a collapsible seat construction as set forth in the preceding paragraph which shall have an improved construction for sturdily supporting the same from the front or rear bumpers of an automobile.

Yet another object of the invention is to provide an auxiliary seat as set forth in the foregoing objects which have a supporting assembly providing a firm and secure but readily removable attachment to the bumper of an automobile for supporting the seat; a leg assembly for bracing and abutting engagement against the side of the bumper of the automobile; together with a releasable brace assembly for imparting strength and rigidity to the construction and preventing collapsing of the device during use.

A more specific object of the invention is to provide an improved collapsible bumper seat as set forth in the above mentioned objects which shall have a slidable and retractable supporting assembly for attaching the seat to the top of a bumper; and shall have a foldable leg and brace assembly for lending rigidity to the seat construction and its support means during use.

A final important object of the invention to be specifically enumerated herein, is to provide a collapsible auxiliary seat construction specifically adapted for use with bumpers of automotive vehicles and wherein is provided a supporting arm assembly slidably retracted beneath the seat together with a pivoting leg assembly and a pivoting and detachable brace assembly associated therewith in a novel manner and foldable beneath the confines of the seat.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view showing a collapsible bumper seat incorporating therein the principle of this invention and mounted upon a portion of a bumper of an automotive vehicle, the concealed or hidden parts of the supporting assembly being indicated by the dotted lines therein.

Figure 2 is a side elevational view of the seat shown in Figure 1, a part of the bumper upon which the seat is mounted being indicated in section therein;

Figure 3:
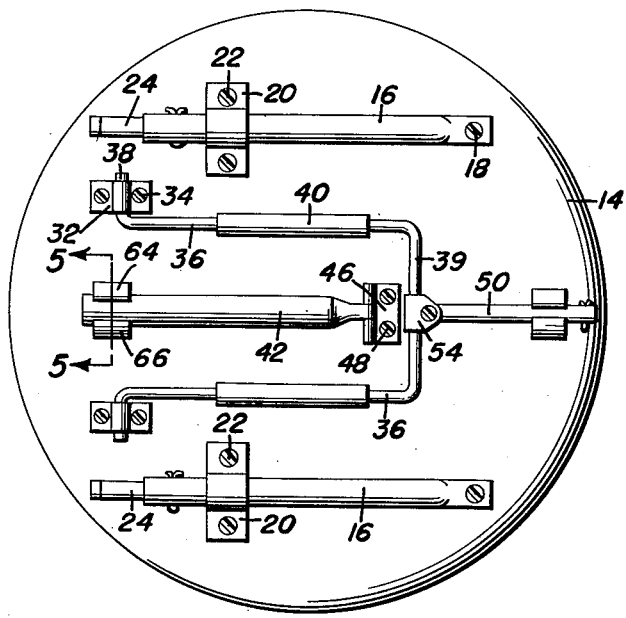
Figure 3 is a bottom plan view of the seat of Figure 1, the supporting assembly of the seat being shown in its folded or retracted position beneath the seat.
Figure 4:
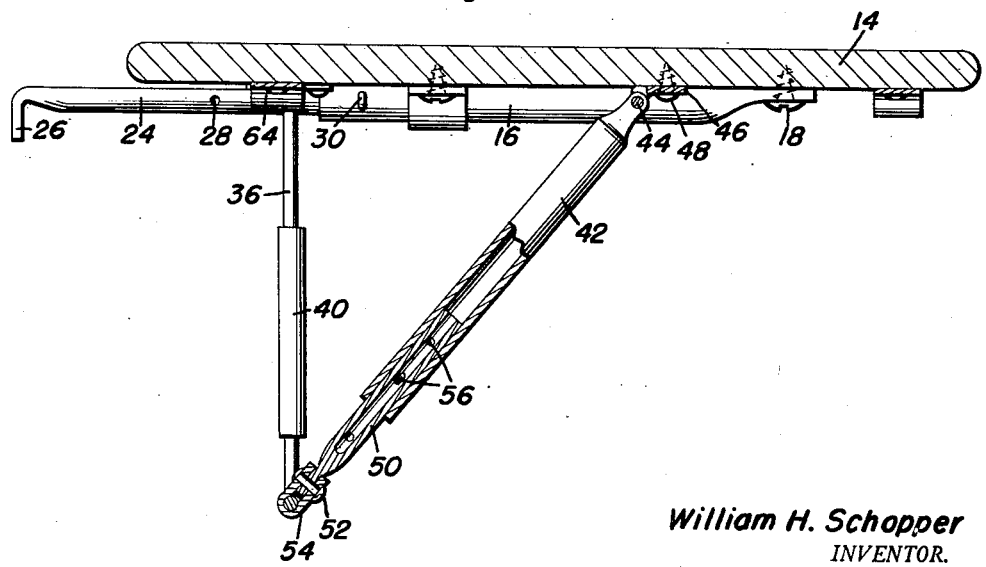

Figure 4 is a vertical longitudinal sectional view, taken substantially on the plane indicated by the section line 4—4 of Figure 1, the bumper being omitted from this view; and Figure 5 is a vertical transverse sectional view, taken substantially on the plane indicated by the section line 5—5 of Figure 3 and showing one of the resilient clips and the manner in which the same yieldingly and releasably retains a part of the brace means of the seat in its folded position beneath the seat.

Referring now more specifically to the accompanying drawings, wherein like numerals designate similar parts throughout the various views, attention is directed first to Figures 1 and 2 wherein it will be seen that the novel collapsible seat assembly indicated generally by the numeral 10 is shown mounted upon a portion of a bumper 12 of any customary type of automotive vehicle. It will be readily appreciated that the seat may be employed upon various conventional forms of bumper construction, that illustrated being a very well known type or construction of bumper.

As will be more readily apparent from Figures 3 and 4 of the drawings, the seat assembly 10 includes a seat member 14 which may be of wood or any other suitable material, constructed in various forms, and may be conveniently fabricated, as shown in a disk-like shape.

In accordance with this invention, there is mounted beneath the seat 14 or on the under surface of the same a retractable seat support means together with a foldable leg means and a slidably detachable adjustable telescoping brace assembly therefor.

The support means comprises a pair of support arms, each of these arms preferably comprising a pair of slidable, longitudinally extensible and telescoping members, in the form of metallic tubes and for rods and the like, each support arm having an outer member 16 which is secured at one end as by a fastening screw or the like 18 to the lower surface of the seat and which adjacent its other end is clamped to the seat as by a conventional U-shaped clamping member 20 secured as by fastening screws 22. Slidably received in the open outer end of the member 16 is the rod-like inner member 24 having a down-turned or hooked portion 26 at its end for engagement over the upper end of the bumper 12 as will be readily apparent from Figure 2. The member 24 may be locked in its extended position by any desired means, such as by a clamping means or the like and conveniently may be detachably secured as by providing a series of longitudinally spaced apertures, one of which is shown at 28, which is adapted to selectively register with a corresponding aperture in the outer member 16 and to be retained therein as by a cotter pin or the like 30. In its collapsed position, as will be seen from Figure 3, the hooked extremity 26 of the inner member 24 of the support arm is completely retractive within the confines or perimeter of the seat 14.

A U-shaped leg member is pivotally secured to the under side of the seat as by U-shaped mounting brackets 32 having screws 34 for securing the same to the seat, the U-shaped member including a pair of parallel legs 36 having outwardly turned hinged portions 38 at their outer ends, and being connected by a web portion 39 at their other ends. Rubber guards in the form of tubular sleeves or the like 40 of any desired yieldable or cushioning material encircle and embrace the legs 36 and are intended to abut the surface of the bumper 12 in the erected position of the leg assembly to prevent marring of the surface of the bumper thereby.

A normal brace means is provided for releasably securing the leg means in its erected position shown in Figures 2 and 4. This brace means preferably comprises a pair of relatively slidable telescoping brace sections in the form of tubular rods or the like, the same including an outer section 42 which is pivoted as at one end at 44 to a mounting bracket 46 secured to the bottom side of the seat as by a fastening screw or the like 48, the other end of the section 42 slidably and telescopingly receiving therein the inner section 50 whose outer end is pivotally attached as at 52 to a connecting bracket 54 slidably embracing the web portion 39 of the U-shaped member. Thus, the inner section of the brace means is pivotally connected to the U-shaped leg member, while the outer section of the brace means is directly pivoted to the bottom of the seat 14.

The arrangement is such that when it is desired to erect the seat for mounting upon a bumper, the leg assembly is pivoted upon its hinging brackets 32 to provide sufficient clearance for the inner brace section to be received into the pivoted outer section 42 in the open end of the same. When the sliding sections of the brace member are assembled as shown in Figure 4, they may be retained in their assembled position as by cotter pins or the like which engage registering apertures 56 in the inner section and corresponding apertures, not shown, in the outer section, the cotter pins being indicated at 58 in Figure 2.

When it is decided to collapse the device, the leg assembly or U-shaped member is pivoted in a clockwise direction as viewed in Figure 4 to withdraw the sliding sections 50 and 42 from engagement with each other, after the cotter pin 58 has been removed, whereupon the leg assembly may be folded inwardly against the bottom of the seat as shown in Figure 3, the inner section 50 may be folded outwardly from the leg member, while the outer section 42 is folded inwardly of the U-shaped leg assembly. The two sliding brace members in their folded position against the seat are frictionally retained in fastening clips as shown in Figure 3 having the construction shown in Figure 5, these clips comprising each a flat base 60 secured as by fastening screws 62 to the under side of the seat 14, the opposite sides of the base having upstanding side walls 64 and 66 which are inturned upon themselves as at 68 and 70 for resiliently embracing the tubular sections of the brace members 42 and 50.

From the foregoing, it will be apparent that in the collapsed position as shown in Figure 3, all of the parts of the supporting structure of the seat are compactly folded and retained against the under side of the seat whereby the same may be compactly stored in relatively confined quarters, while in the erected position of the seat the support arms are adapted to engage by their hooks over the upper end of the bumper 12, the erected U-shaped leg assembly bears against the side of the bumper and is retained in rigid relation thereto by means of the detachable brace means.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A collapsible seat assembly comprising a seat, support means attached to said seat for mounting the same upon an automobile bumper, leg and brace means pivoted to said seat for pivotal movement from a folded position to an erected position, said leg means being engageable against an automobile bumper, said support means comprising a pair of support arms including longitudinally extensible telescoping sections, means for clamping said sections in longitudinally extended position.

2. A collapsible seat assembly comprising a seat, support means comprising pairs of longitudinally extensible telescoping sections attached to said seat for mounting the same upon an automobile bumper, means pivoted to said seat for pivotal movement from a folded position to an erected position, said means being engageable against an automobile bumper, said means comprising a leg member hinged to said seat and an adjustable brace member connected to said seat and to said leg member.

3. A collapsible seat assembly comprising a seat, support means attached to said seat for mounting the same upon an automobile bumper, means pivoted to said seat for pivotal movement from a folded position to an erected position, said means being engageable against an automobile bumper, said means comprising a leg member hinged to said seat and an adjustable brace member connected to said seat and to said leg member, said leg member comprising a U-shaped body having its ends hingedly connected to said seat, said brace member being journaled on the web portion of the U-shaped member.

4. A collapsible seat assembly comprising a seat, support means attached to said seat for mounting the same upon an automobile bumper, means pivoted to said seat for pivotal movement from a folded position to an erected position, said means being engageable against an automobile bumper, said means comprising a leg member hinged to said seat and an adjustable brace member connected to said seat and to said leg member, said leg member comprising a U-shaped body having its ends hingedly connected to said seat, said brace member being journaled on the web portion of the U-shaped member, said brace member including telescoping, longitudinally slidable sections, one section having a pivotal connection to the seat and the other section to the web of the U-shaped member, means for detachably securing said slidable sections in longitudinally extended position.

5. A collapsible seat assembly comprising a seat, support means attached to said seat for mounting the same upon an automobile bumper, means pivoted to said seat for pivotal movement from a folded position to an erected position, said means being engageable against an automobile bumper, said means comprising a leg member hinged to said seat and an adjustable brace member connected to said seat and to said leg member, said leg member comprising a U-shaped body having its ends hingedly connected to said seat, said brace member being journaled on the web portion of the U-shaped member, said brace member having telescoping, longitudinally slidable sections, one section having a pivotal connection to the seat and the other section to the web of the U-shaped member, means for detachably securing said slidable sections in longitudinally extended position, a pair of resilient clips on said seat for retaining said sliding sections in folded position against said seat.

WILLIAM H. SCHOPPER.

REFERENCES CITED

The following references are of record in the file of this patent:

UNITED STATES PATENTS

| Number | Name | Date |
| --- | --- | --- |
| 829,537 | Mills | Aug. 28, 1906 |
| 1,217,950 | Johnston | Mar. 6, 1917 |
| 1,976,121 | Gazvoda | Oct. 9, 1934 |
| 2,228,203 | De Hoffman | Jan. 7, 1941 |
| 2,349,092 | Hammer | May 16, 1944 |